United States Patent [19]

Callahan

[11] Patent Number: 5,487,521
[45] Date of Patent: Jan. 30, 1996

[54] STEERING WHEEL MOUNTED SUPPORT FOR COMPUTER, PRINTED MATTER, FOOD, AND/OR BEVERAGE

[76] Inventor: Jack D. Callahan, P.O. Box 460442, San Francisco, Calif. 94146-0442

[21] Appl. No.: 404,319

[22] Filed: Mar. 15, 1995

[51] Int. Cl.⁶ .................................................. A47B 19/00
[52] U.S. Cl. ..................... 248/441.1; 108/44; 224/276; 248/917
[58] Field of Search ............... 248/441.1, 917, 248/919, 921; 224/276, 277; 108/44, 45

[56] References Cited

U.S. PATENT DOCUMENTS

| | | | |
|---|---|---|---|
| 1,883,714 | 10/1932 | Gray | 281/45 |
| 1,977,507 | 10/1934 | Edwards | 224/276 |
| 2,150,709 | 3/1939 | Bake | 224/276 |
| 3,643,606 | 2/1972 | Vise | 108/44 |
| 4,139,217 | 2/1979 | Jamison . | |
| 4,375,881 | 3/1983 | Mitchell | 248/441.1 |
| 4,726,607 | 2/1988 | White | 248/304 |
| 4,788,658 | 7/1988 | Hanebuth | 312/223 |
| 4,797,538 | 1/1989 | Schick . | |
| 4,845,591 | 7/1989 | Pavie | 211/41 |
| 4,909,159 | 3/1990 | Gonsoulin | 108/44 |
| 4,917,130 | 4/1990 | Sweder | 132/288 |
| 4,941,845 | 7/1990 | Eppley et al. . | |
| 4,946,120 | 8/1990 | Hatcher | 248/183 |
| 4,974,805 | 12/1990 | Douglas | 248/447.1 |
| 4,995,637 | 2/1991 | Muraishi | 108/44 X |
| 5,060,581 | 10/1991 | Malinski | 108/44 |
| 5,170,720 | 12/1992 | Scheurer | 108/44 |
| 5,177,665 | 1/1993 | Frank et al. | 108/44 |

Primary Examiner—Ramon O. Ramirez

[57] ABSTRACT

A mounting assembly for ergonomically supporting a small portable computer, expanded computer keyboard, printed matter, food and/or beverage. The assembly is comprised of two pieces: an upper clipboard (CB) (10) which releasably attaches to a steering wheel (22) and which is also attached to an angularly adjustable tray (20). Both the CB (10) and the tray (20) have ledges on their respective lower extremities for holding large freestanding printed matter. The CB (10) has a clip (16) on its uppermost surface for holding small printed books. The tray (20) holds food and/or beverage when in a horizontal position as well as serving as a small desk for writing in longhand. The assembly nests flat for storage and shipping.

8 Claims, 6 Drawing Sheets

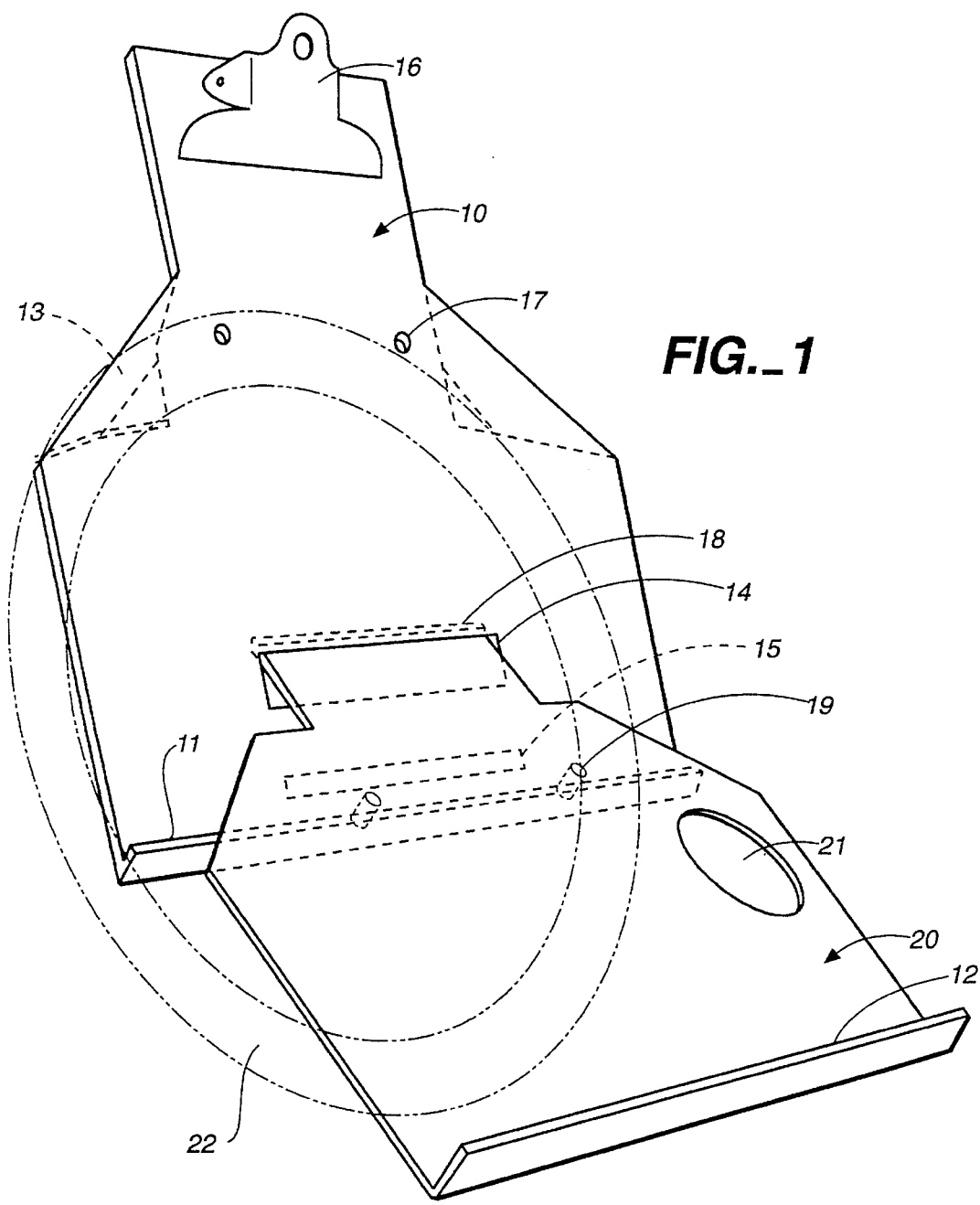
FIG._1

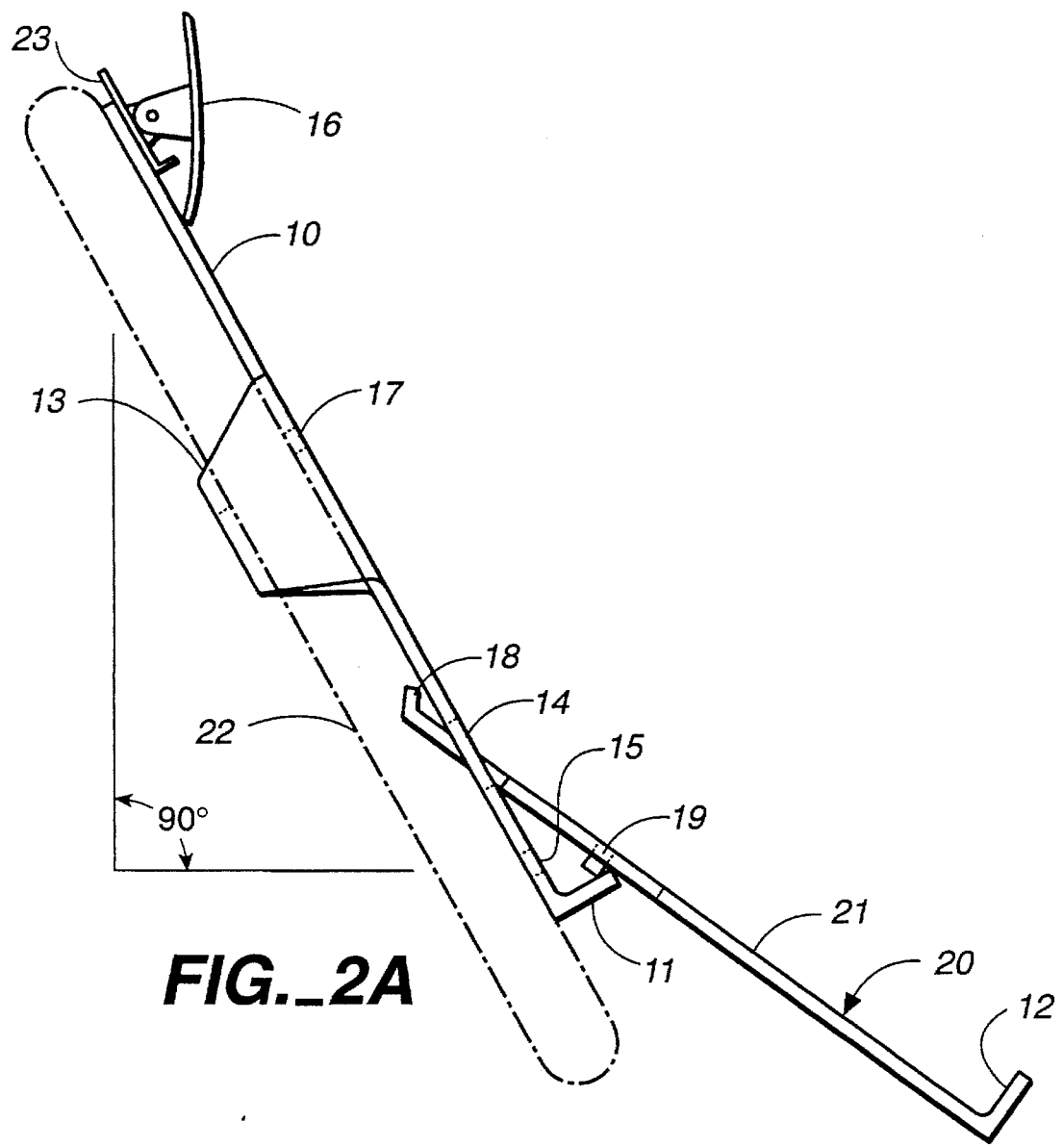
FIG._2A

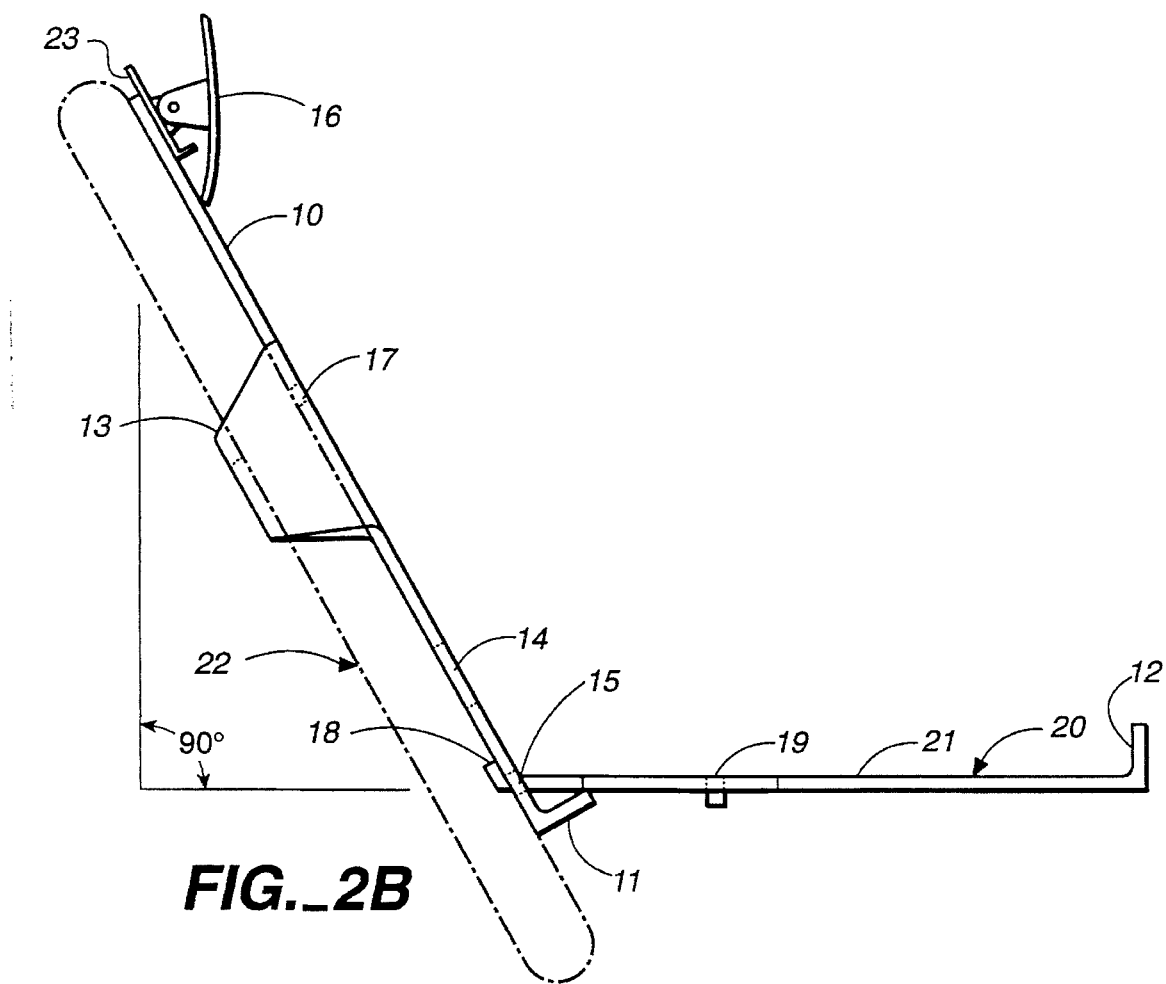
FIG._2B

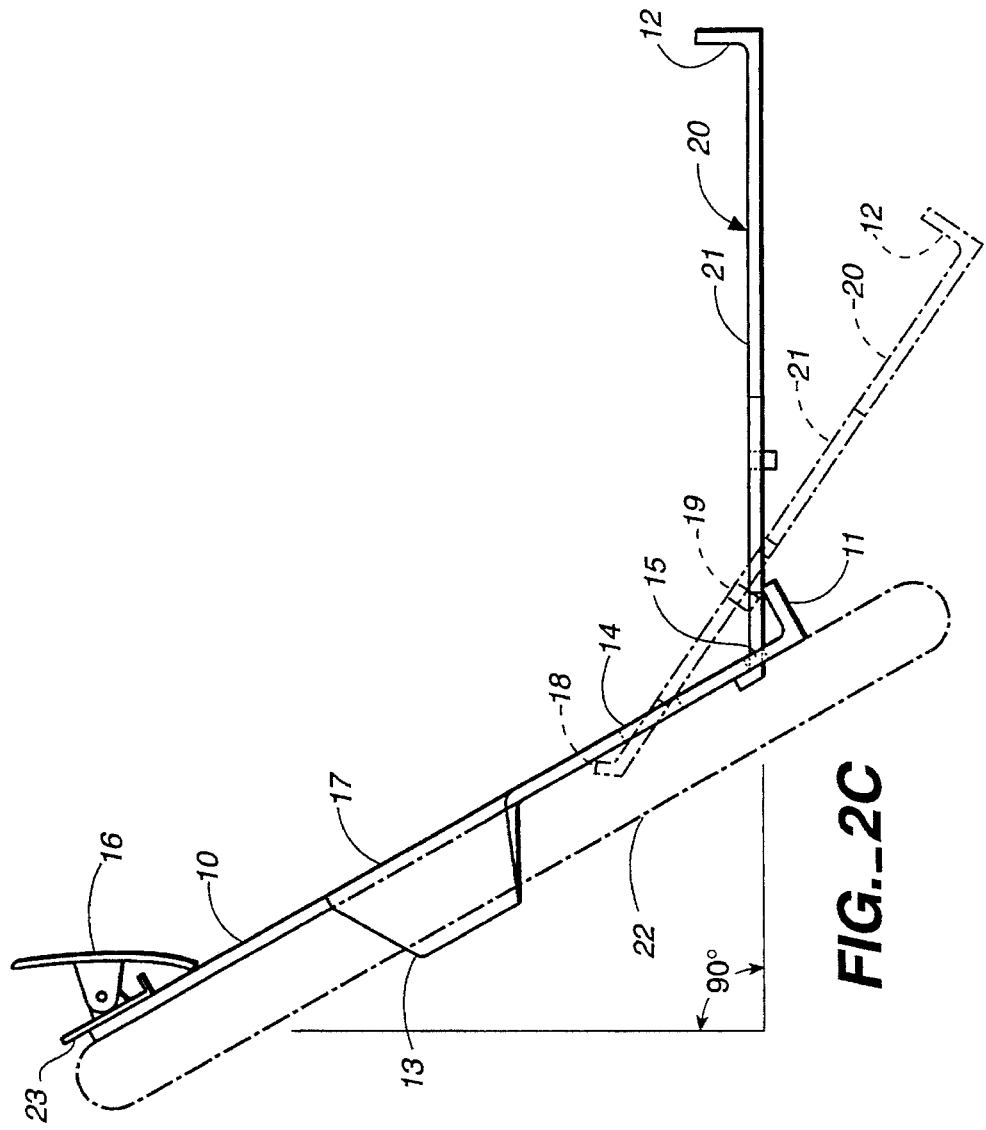
FIG._2C
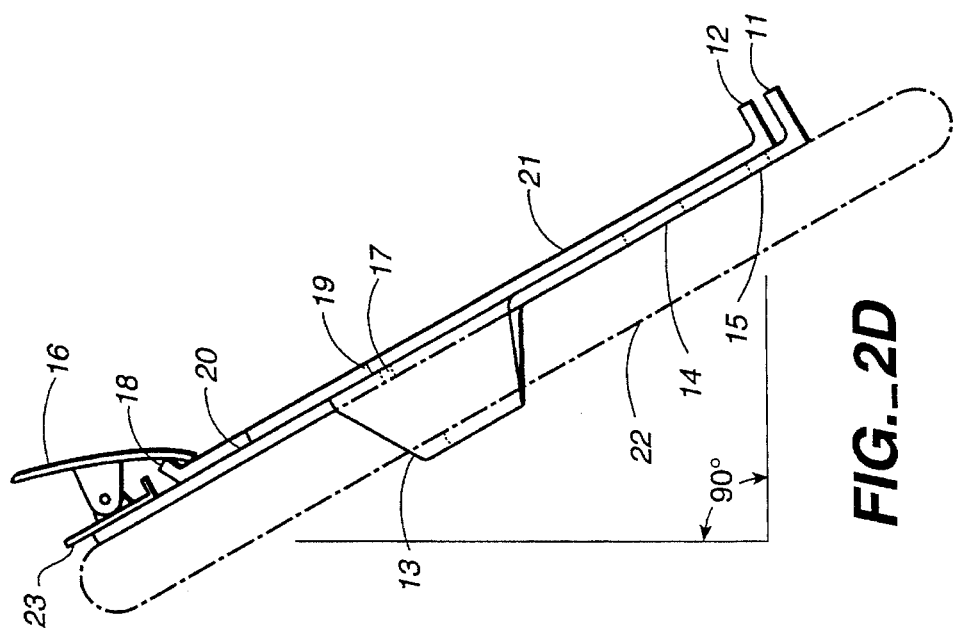
FIG._2D

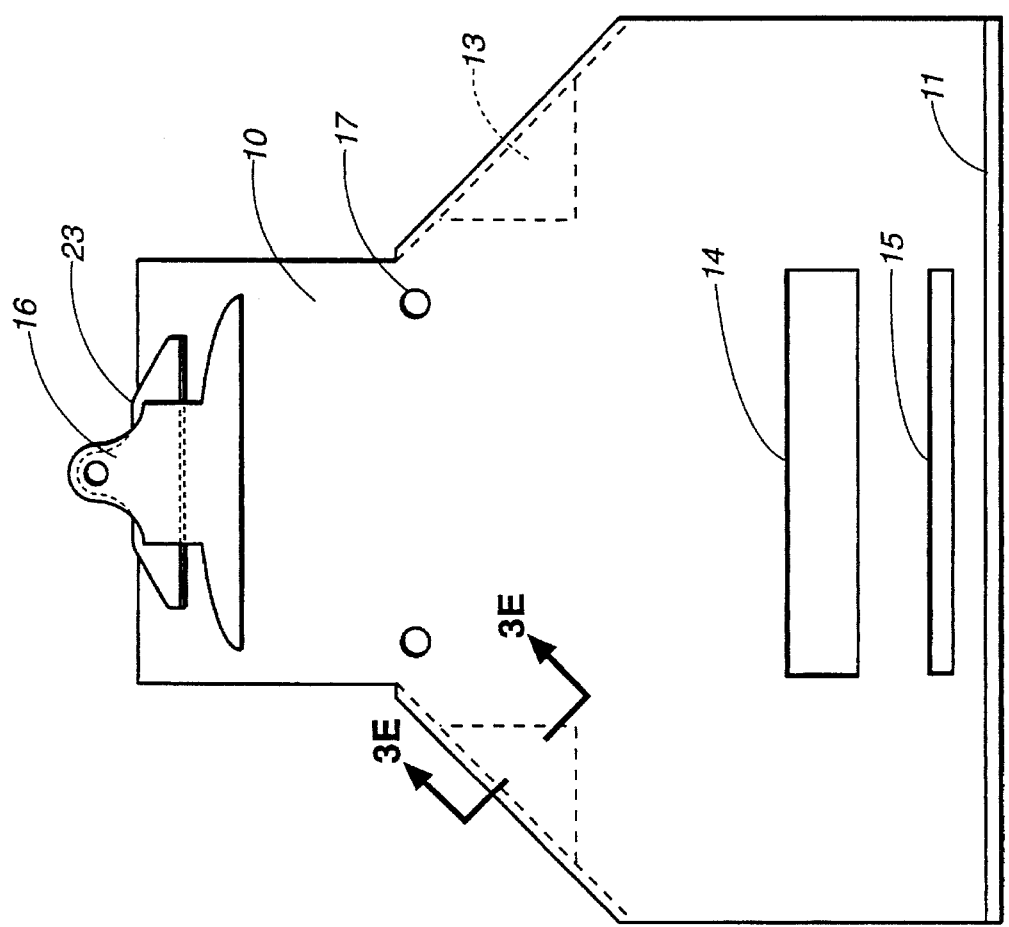
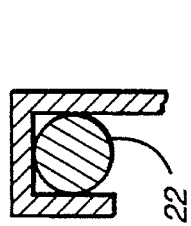
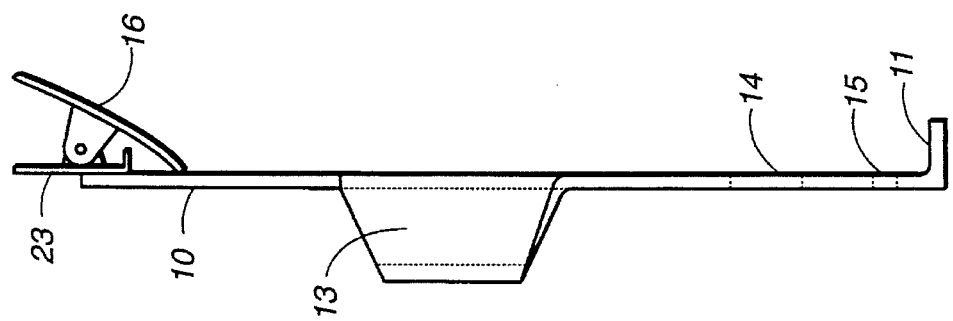

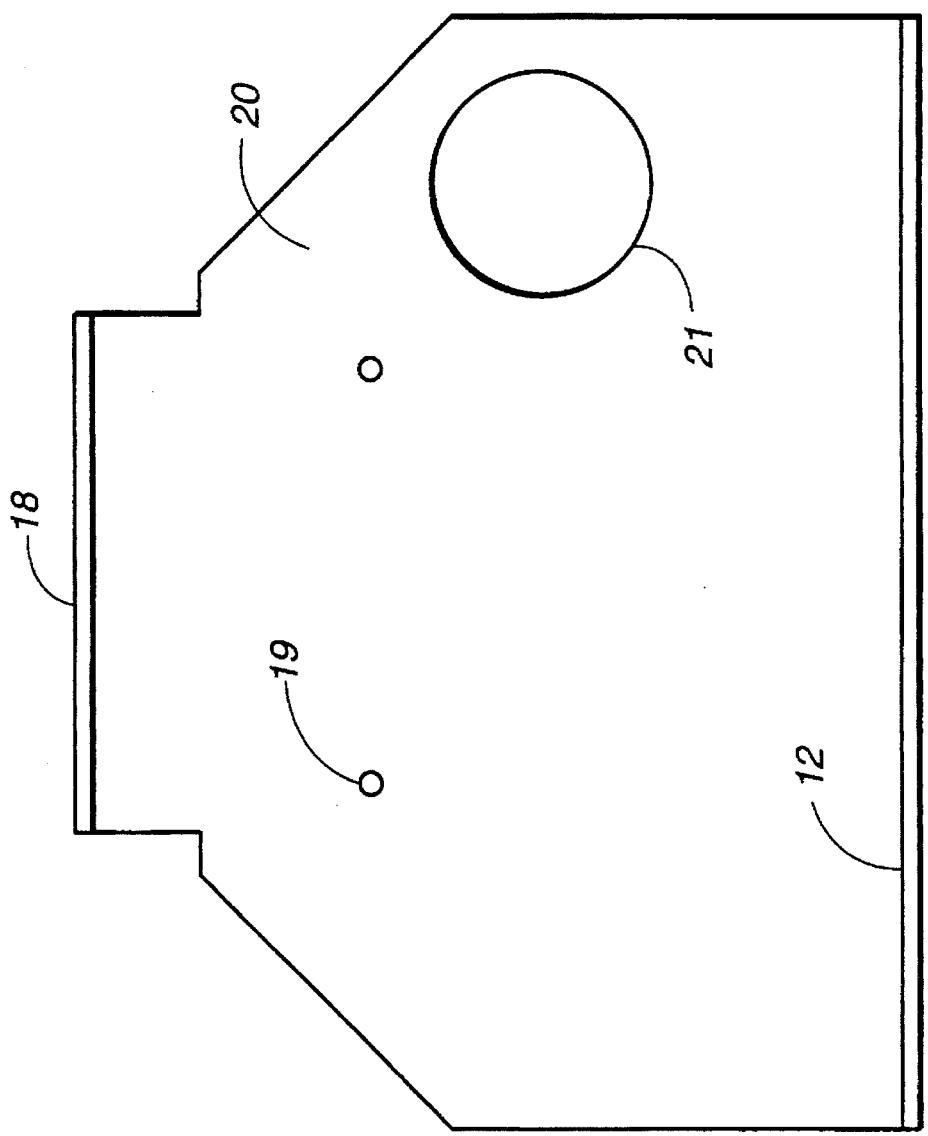
*FIG._3B*
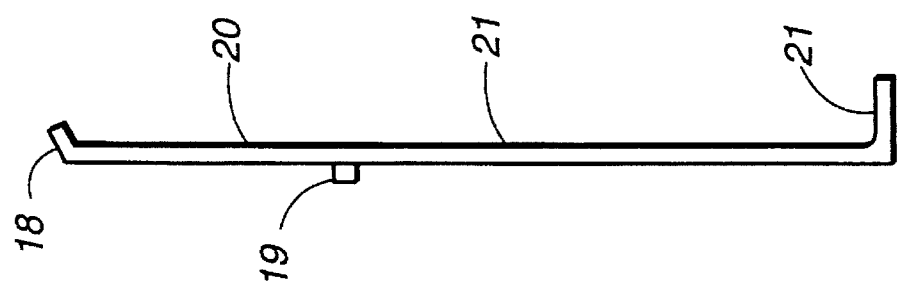
*FIG._3C*

STEERING WHEEL MOUNTED SUPPORT FOR COMPUTER, PRINTED MATTER, FOOD, AND/OR BEVERAGE

BACKGROUND-FIELD OF THE INVENTION

This invention relates to auto, truck, or boat steering wheel attachments, particularly to such attachments which make it possible for a person sitting behind the wheel to ergonomically perform a multiplicity of functions normally performed in an office.

BACKGROUND-DESCRIPTION OF PRIOR ART

Persons who operate businesses out of their vehicles often need to ergonomically use a computer, read, write, eat, drink, sketch, etc., while seated behind the steering wheel, when the vehicle is parked.

Several devices have been created that aid such a person in these tasks; they mount on and dismount from the vehicle's steering wheel.

Malinski in U.S. Pat. No. 5,060,581, Oct. 29, 1991, shows a steering wheel tray which mounts on a steering wheel and holds food, but any drink thereon will be in a precarious position and subject to easy spilling. Any magazine or book will likewise be subject to easy collapse. Ring binders will be next to impossible to use due to interference of the tray support strips on each side of the tray, which is narrow.

Malinski's assembly is useless as a writing surface for all but small notes. The use of an extended keyboard or laptop computer would be uncomfortable, if not impossible, due to interference of the tray support strips on each side of the narrow tray.

Douglas, in U.S. Pat. No. 4,974,805, Dec. 4, 1990, shows a clipboard for a steering wheel. It allows one to clip writing materials to a flat surface and write in longhand on such a surface. Douglas's clipboard does not allow the use of a laptop computer, nor will it hold food or beverage, catalogues, ring binders, sales manuals, books, drawings, sketching materials, paperback books, or the like. Douglas's clipboard is, therefore, too limited in scope for the person who must eat and drink, use a computer, read a book, etc., from behind the steering wheel of an automobile.

Frank and Jewel, in U.S. Pat. No. 5,177,665, Jan. 5, 1993, shows a housing and vehicular support for a portable computer. It provides a mounting assembly for a portable computer to be used on a steering wheel, but has not taken into account several other necessary functions that such an assembly should provide for the lifestyle of the working person who must eat food and drink beverages, read while dining, use sales manuals, enter data in a data base from notes held by a clip, all while sitting behind a steering wheel. Their device also does not provide any nonslip means to keep a computer from sliding off of the tray. The tray does not have a positive position lock to prevent a sudden downward release which would result in possible serious damage to the computer as it slides off, possible forcefully striking the floorboard. Also the sides of the tray holding the computer do not permit the use of an expanded keyboard externally connected to a laptop computer, as is the custom in many police vehicles.

Other prior-art devices are not versatile enough to provide more than two of the required minimum of at least six office type functions that can be performed by a person seated behind the steering wheel.

OBJECTS AND ADVANTAGES

Accordingly, several objects and advantages of the present invention are:

1. To provide an ergonomic support to hold food and beverage for comfortable, and spill-safe dining for one seated behind a vehicle's steering wheel, 2. To provide an ergonomic support to hold reading material, such as paperbacks, magazines, or newspapers, that can be read for pleasure when one is eating while seated behind a vehicle's steering wheel, 3. To provide an ergonomic support for writing longhand while one is seated behind a vehicle's steering wheel, 4. To provide an ergonomic support to hold catalogues, sales manuals, notes for copying or information to be entered in the database of the computer in use, while the operator is seated behind a vehicle's steering wheel, 5. To provide an ergonomic support to hold a laptop computer, or an expanded keyboard externally connected to a laptop computer, while the operator is seated behind a vehicle's steering wheel, and 6. To provide an assembly that will nest flat and compact for packaging and shipping to dealers and users, and for storage in the vehicle.

Further objects and advantages are to provide an assembly which is easily attached to, and released from, the steering wheel without any tools or special knowledge, and which is obvious how to use by just looking at it, even to a child. Furthermore, the assembly is easy to manufacture, inexpensive, and safe to use.

Still further objects and advantages will become apparent from a consideration of the ensuing description and drawings,

BRIEF DESCRIPTION OF THE DRAWINGS

FIG. 1 displays a perspective view of a steering wheel mounted support illustrating this assembly supported on the steering wheel of a vehicle.

FIG. 2A illustrates a side view of the tray in the same position as in the perspective drawing of FIG. 1.

FIG. 2B illustrates the side view of FIG. 1 with the tray in a horizontal position for holding food and beverage.

FIG. 2C illustrates the side view of FIG. 2A and 2B tray positions superimposed.

FIG. 2D illustrates how the tray and clipboard nest flat against each other.

FIGS. 3A, 3B, 3C, and 3D illustrate side and front views of the clipboard and tray of FIG. 1.

FIG. 3E illustrates Section 3E—3E of a clipboard hook attached to a vehicle's steering wheel.

| Reference Numerals in Drawings: | | |
|---|---|---|
| 10 clipboard (CB) | 15 CB lower slot | 20 tray |
| 11 CB support ledge | 16 CB clip | 21 beverage hole |
| 12 tray ledge and support | 17 tray peg holes | 22 steering wheel |
| 13 CB wheel hooks | 18 tray holder lip | 23 mounting bracket |
| 14 CB upper slot | 19 tray holder pegs | |

DESCRIPTION

A typical embodiment of the support is illustrated most clearly in the perspective view of FIG. 1.

FIG. 1 shows a vehicular mounting assembly composed of a clipboard (CB) 10 and a tray 20. CB 10 has CB clip spring loaded 16 for holding paperback books, notes, etc. CB 10 also has a CB support ledge 11 which can hold sales manuals, catalogues, ring binders etc. CB wheel hooks 13, shown in FIGS. 3A, 3C, and 3E (Section 3E—3E), hold CB 10 on the steering wheel. As shown in FIG. 2A, the CB has an upper slot 14 which holds tray 20 by a tray holder lip 18. FIG. 2A further shows a pair of tray holder pegs 19, which rest on CB support ledge 11, and firmly hold tray 20 in place while a laptop computer is being used. Tray ledge and support 12 keeps a laptop computer, or any other device or materials, such as sketch pads, albums, tabloids, magazines, newspapers, and the like, from sliding off.

CB hooks 13 and CB support ledge 11 are bent or formed from the same piece of material as CB 10. A tangential relationship of CB wheel hooks 13 with the perimeter of steering wheel 22 may be aesthetically desirable, but is not functionally critical or even necessary. Thus CB wheel hooks 13, may be non-pivotal.

CB 10 may conveniently be formed from a suitable rigid material, such as synthetic resin or sheet metal. These materials are readily found nationally in local plastic or sheet metal supply houses. Since the average steering wheel is 38 cm in diameter, CB 10 is preferably 38 cm wide and 38 cm high. Tray 20 is preferably 38 cm wide and 28 cm high.

CB 10 has a pair of tray peg holes 17, and an upper slot 14. CB 10 also has a lower slot 15 which can be stamped or cut to size. The CB wheel hooks 13 and CB support ledge 11 can be formed by the application of heat and pressure when the material used is a synthetic resin, such as transparent polycarbonate. If metal is used, all operations can be performed by standard sheet metal forming equipment which is universally available. Tray 20 can be formed in the same way.

Tray 20 can be used in either of two preferred positions, as shown in FIGS. 2A or 2B. As shown in FIG. 2B, tray 20 is in lower slot 15, which is the horizontal position used for writing, eating, drinking, etc. Tray holder lip 18 holds the tray firmly to the rear top edge of lower slot 15 and will not come out unless the tray 20 is raised to a nearly vertical position. Tray 20 has a beverage hole 21 which will hold all normally available small, medium, and large soft drink containers.

The foregoing assembly enables one to ergonomically use a small portable computer when a vehicle is at rest, and while one sits behind a vehicle's steering wheel. Extensive travellers, such as salespersons, insurance claim adjusters, policemen in patrol cars, real estate appraisers, telecommuters, and the like, are in constant need of such a device which is so versatile, and which features ergonomic reading, writing, and spillsafe eating and drinking while one sits behind vehicle's steering wheel.

OPERATION

When it is necessary to use a laptop computer, extended keyboard, or the like, the user simply slips CB 10 over steering wheel 22. CB wheel hooks 13 will hold CB 10 in place. Tray 20 is then inserted, tray holder lip 18 firsts, into CB upper slot 14. Lip 18 will grab the upper back edge of slot 14 and tray holder pegs 19 will rest on support ledge 11. The weight of the computer (not shown) will further insure that tray 20 will not become disengaged from CB 10. The same positive engagement of tray 20 to CB 10 is assured when catalogues, sales manuals, extended keyboards, and the like are used in this mode, as in FIG. 2A.

When laptop computers, extended keyboards, catalogues, sales manuals, and the like are being used, it is generally most convenient for tray 20 to be at an angle of approximately 120° from vertical. Most domestic and even imported vehicles am equipped with steering wheels which are at an angle of approximately 150° from vertical. Steering wheels which are at an angle of approximately 150° from vertical will insure the most convenient angle of 120° for tray 20 when it is in CB slot 14.

With CB 10 in place on wheel 22, and tray 20 in CB lower slot 15, and resting on ledge 11, tray 20 will be in the horizontal position as in FIG. 2B. This orientation is especially convenient for eating and drinking with the drink container (not shown) resting in beverage hole 21. If the person eating behind the steering wheel wishes to read for pleasure, the reading material, whether paperback book, magazine, or the like, may easily be held securely by clip 16 at the top of CB 10. With tray 20 in lower slot 15, tray 20 will be in a nearly horizontal position, i.e., at approximately 90° from vertical. Either of the two preferred tray 20 positions may be selected by inserting tray 20 into slot 14 for computer usage, or by inserting tray 20 into slot 15 for eating and drinking.

SUMMARY, RAMIFICATIONS, AND SCOPE

The reader will see that this device provides a vehicular mounting assembly that is instantly attachable to, and detachable from, a steering wheel, and has a tray that can be positioned in a plurality of angles which provide means to ergonomically perform the following functions:

It can hold solid food containers and any one of the three popular size soft drink containers served at most fast-food and take-out restaurants.

With it one can write longhand on the horizontal surface of the tray.

One can secure reading material, such as books or papers, in the clip at the top of the clipboard.

One can secure sales manuals or catalogues on the ledge of the clipboard, or on the ledge of the tray, depending upon the size of the sales manuals or catalogues, ring binders, or the like.

One can secure a laptop computer or an extended keyboard on the tray in an ergonomic position for the person behind a vehicle's steering wheel.

Further ramifications include the following variations for gripping the clipboard to the circular car wheel, such as flanges, straps, hook-and-loop fasteners, or any other means to positively secure the clipboard to a vehicle's steering wheel.

Additional ramifications may include fast food containers made to attach to, and detach from, a vehicle's steering wheel, which containers can be made of extremely inexpensive material and inexpensive functional and structural shape. The top of such a fast food container and support can be made to attach to the top of a vehicle's steering wheel by means of an elongated opening cut to fit a sufficient portion of the wheel to hold fast. The tray portion of the container and support can be held in a horizontal orientation by accordion pleated side flaps that unfold as the top is opened and attached to the vehicle's steering wheel. The food is then in compartmented tray portion of the container and support, and can easily, and comfortably be eaten by one sitting behind a vehicle's steering wheel. Although these fast food containers and supports should be so inexpensive they can be thrown away after one useage, they have the same background as the assembly to hold computers.

Although the descriptions above contain many specificities, these should not be construed as limiting the scope of the invention but, as providing illustrations of some of the presently preferred embodiments. Other embodiments are possible. The clipboard and tray can be made of a folding material, such as a semi-rigid plastic which will fold along a seam which has been thinned by heat and pressure or by removing material with a machine tool. Another variation can be a clipboard and tray assembly which can be folded flat by means of a metal hinge.

Thus, the scope of the invention should be determined by the appended claims and their legal equivalents, rather than by the examples given.

I claim:

1. A vehicular mounting assembly releasable attached to a vehicle steering wheel comprising:

a clipboard having a top end, a bottom end, an upper surface and a back surface;

clip means on said clipboard top end for removable retaining printed material against said upper surface;

a planar tray having a top end, a bottom end, an upper surface and a back surface;

affixing means on said tray for removable securing said tray to the clipboard;

adjusting means on said clipboard; wherein said adjusting means cooperates with said affixing means for adjusting the tray at a plurality of angles with respect to the clipboard; and means for attaching the clipboard to the steering wheel.

2. The assembly recited in claim 1 wherein said tray can be held in a horizontal position.

3. The assembly recited in claim 1 wherein said tray contains a hole having a predetermined size to hold a beverage container within a predetermined size.

4. The assembly recited in claim 1 wherein said tray has a ledge at its bottom end to support printed material.

5. The assembly recited in claim 1 wherein said clipboard has an edge at its bottom end to support printed material.

6. The assembly recited in claim 1 wherein said affixing means comprises a lip at said top end and peg means on said back surface of said tray.

7. The assembly recited in claim 1 wherein the means for attaching comprises a hook extending from said clipboard.

8. The assembly recited in claim 1 wherein said clip is spring loaded.

* * * * *